United States Patent

Kaelin

[11] 3,853,480
[45] Dec. 10, 1974

[54] APPARATUS FOR THE CONVERSION OF PREPARED REFUSE SEWAGE SLUDGE MIXTURES INTO EARTH SUBSTANCE BY BIOLOGICAL DECOMPOSITION

[76] Inventor: Joseph Richard Kaelin, Villa Seeburg, Buochs, Switzerland

[22] Filed: Jan. 13, 1972

[21] Appl. No.: 217,581

[30] Foreign Application Priority Data
Jan. 21, 1971 Switzerland............................ 916/71

[52] U.S. Cl...................................... 23/259.1, 71/9
[51] Int. Cl. ............................................. C05f 9/02
[58] Field of Search ................. 71/10, 9, 12, 13, 14; 23/259.1, 259.3; 210/10, 15, 199, 218

[56] References Cited
UNITED STATES PATENTS

| | | | |
|---|---|---|---|
| 1,832,179 | 11/1931 | Boggiano-Pico | 23/259.1 X |
| 2,178,818 | 11/1939 | Earp-Thomas | 71/9 UX |
| 2,209,613 | 7/1940 | Roeder | 71/10 X |
| 2,474,833 | 7/1949 | Eweson | 71/9 |
| 2,639,902 | 5/1953 | Kuebler | 71/9 UX |
| 2,660,809 | 12/1953 | Morrison | 23/259.1 X |
| 2,680,069 | 6/1954 | Eweson | 71/9 |
| 3,245,759 | 4/1966 | Eweson | 23/259.1 |
| 3,314,765 | 4/1967 | Abson et al. | 23/259.1 |
| 3,756,784 | 9/1973 | Pittwood | 23/259.1 |

*Primary Examiner*—Joseph Scovronek
*Attorney, Agent, or Firm*—McGlew and Tuttle

[57] ABSTRACT

A method of and apparatus for converting a prepared refuse-sewage sludge mixture by biological decomposition into an earth substance, wherein the refuse-sewage sludge mixture is introduced into a container closed at all sides. Air is infed in a controlled manner transversely through the refuse-sewage sludge mixture within such closed container, and the decomposition process is carried out continuously.

7 Claims, 2 Drawing Figures

APPARATUS FOR THE CONVERSION OF PREPARED REFUSE SEWAGE SLUDGE MIXTURES INTO EARTH SUBSTANCE BY BIOLOGICAL DECOMPOSITION

BACKGROUND OF THE INVENTION

The present invention relates to a new and improved method for the transformation or conversion of prepared refuse sewage sludge mixtures into earth substances by biological decomposition as well as to a new and improved apparatus for the performance of the aforesaid method.

It is already known to the art to mix the sewage sludge obtained from a sewage treatment plant or installation with comminuted domestic refuse from cities and villages and to convert such into composite earth by different techniques based on biological processes.

The simplest method, yet one unsuitable for the environment of the installation, is to merely deposit the refuse in troughs located in the surrounding terrain. Yet, for a number of different reasons, such as the great pour height, large moisture content and so forth, there is not present the requisite quantity of oxygen for the bacteriological decomposition. The decomposition process proceeds only very slowly and in fact partially in the form of a decaying process, contaminating the atmosphere.

An improvement was realized by an orderly deposit of the refuse, by means of which it was possible to avoid affecting the underground water.

In order to accelerate the conversion or transformation process and to prevent the deleterious effects as concerns the atmosphere and underground water, newer techniques have been developed. These systems can be divided into two main groups;

a. reposed tubular furnaces which rotate about their lengthwise axis; and b. upstanding stage towers, for instance those designated as "Multibacto."

A feature common to both systems is the movement of the refuse which is to be bacteriologically decomposed. More recent experiments have shown that the decomposition process proceeds quicker and more completely when there is present a stationary refuse-sludge mixture.

Such type installation has already become known to the art. The charging and removal of its container, which is open at the top, takes place discontinuously. The air is drawn in surges, by means of a suction blower, through the refuse-sludge mixture, the air moving in vertical direction from the top, that is, from the atmosphere downwardly. Aeration is controlled by the $CO_2$-content and the temperature of the air throughput. The air throughput is not positively distributed over the entire crosssection of the decomposed material. The air tends to flow along the path of least resistance. Hence, the situation can arise where certain zones are not contacted by fresh air, i.e., do not come into contact with oxygen. Therefore, the conversion process is interrupted and an irregular decay or rotting appears. Owing to the discontinuous charging and removal of the processed material it is not possible to employ this installation in an automatic process where the individual process steps are interlinked. Furthermore, the air influx can not be regulatably controlled.

SUMMARY OF THE INVENTION

Hence, from what has been explained above it should be apparent that a real need still exists in the art for a method of, and apparatus for, converting refuse-sewage sludge mixtures by biological decomposition processes in a manner not associated with the aforementioned drawbacks and limitations of the prior art techniques and constructions. Therefore, a primary objective of the present invention is to effectively and reliably fulfill the existing need in the art and to overcome the disadvantages associated with the state-of-the-art processes and installations for the conversion of refuse-sewage sludge mixtures.

Another object of the present invention relates to a new and improved method for the conversion of refuse-sewage sludge mixtures in an extremely economical and reliable fashion and to equipment suitable for the performance of the aforesaid inventive method.

Now, in order to implement these and still further objects of the invention, which will become more readily apparent as the description proceeds, the inventive method is manifested by the features that controlled air is caused to flow transversely through the refuse-sewage sludge mixture which is located in a container closed at all sides, and that the decomposition process is carried out continuously.

The inventive apparatus for the performance of the aforesaid inventive method is manifested by the features that there is provided a container closed at all sides and to which there is automatically delivered the material intended to be converted. Upon completion of the decomposition process the material is automatically removed from such container. There is also provided mechanism for delivering the oxygen required for the conversion process. This oxygen delivery mechanism produces an oxygen stream which flows from the central axis transversely towards the walls of the container. The entire operation of the apparatus, also referred to as a reactor, occurs for itself in association with equipment arranged in front of and after the reactor.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
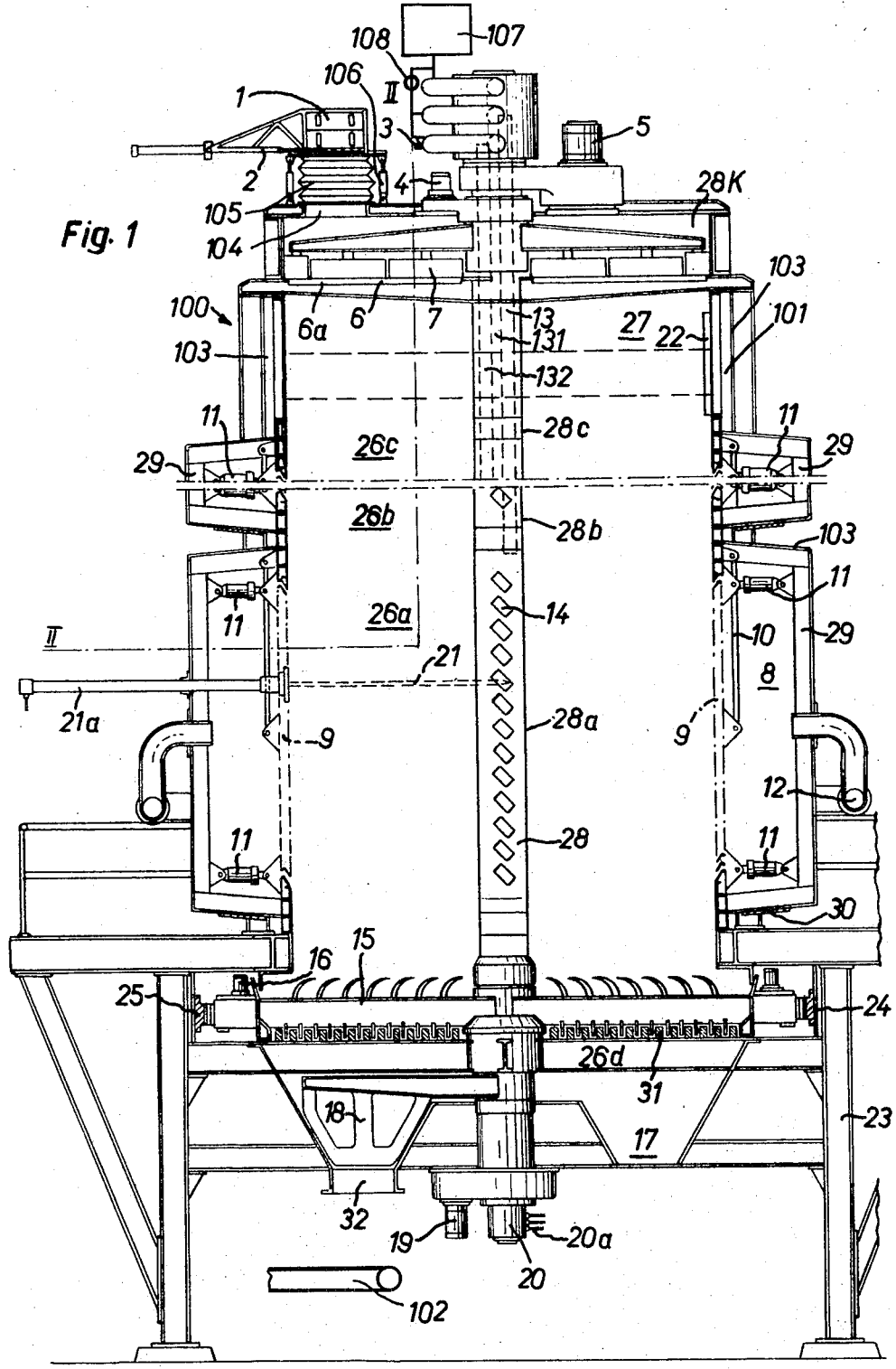
FIG. 1 is a vertical sectional view of a preferred constructional form of inventive apparatus for converting a refuse-sewage sludge mixture.
Figure 2:
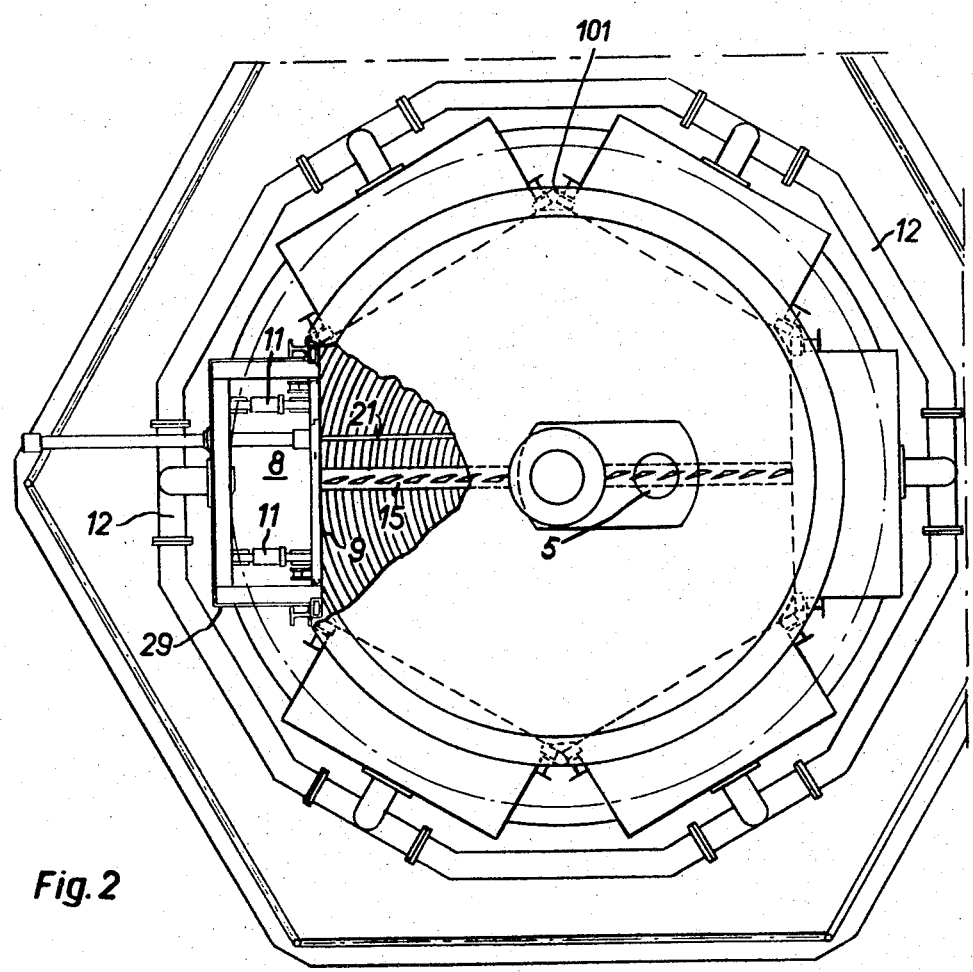
FIG. 2 is a plan view of the equipment of FIG. 1 and partially also in section substantially taken along the line II—II of FIG. 1.

Describing now the drawings, there is illustrated therein a preferred constructional form of inventive apparatus for the conversion or transformation of refuse-sewage sludge mixtures into earth substances and suitable for carrying out the method aspects of this development. More specifically, it will be seen that a silo tower 100 of the equipment embodying a completely closed container 101 is supported upon a supporting base frame 23. Both the base frame 23 and also the tower skeleton structure forming the tower 100 are built in accordance with conventional techniques utilized in the steel building industry. A material removal or discharge ring 24 equipped with a gear or tooth rim 25 for the movement of a material removal or discharge arm 15 is mounted directly upon the base framework 23. The drive unit or motor 16 for the discharge arm 15 is peripherally arranged as shown. This material removal arm 15 scrapes the material through a substantially circular bottom grate 31 into a collecting trough 17. An ejector 18, driven by a separate, infinite speed regulatable hydrostatic drive 19 and rotatable about the central axis of the equipment, conveys the earth via an outlet or discharge 32 out of the reactor. For the purpose of further conveying the earth there can be utilized, for instance, a conveyor band 102 or equivalent material conveying structure, which, however, has been only schematically depicted in FIG. 1 below the outlet 32 for the purpose of preserving clarity in illustration especially since such conveying mechanism is conventional.

The infeed of pressurized fluid, e.g. oil for the drive unit 16 located externally of the container 101, is carried out centrally of the container 101 through the agency of a kingpin 20, and the infeed line 20a. Above the material discharge or removal zone 26d there are advantageously arranged three superimposed aeration- and deaeration zones 26a, 26b, 26c, wherein only the lowermost zone 26a has been completely illustrated. Each aeration and deaeration zone is equipped with six suction boxes or cabinets 29 which are secured to the wall of the container 101 and arranged such that in cross-section they form a hexagon. The outer wall of the reactor container 101 and the outer walls of suction boxes are insulated against heat radiation, for instance by means of a suitable heat insulation coating or covering 103. A charging cylinder 27 is located above the third schematically represented aeration zone 26c, this charging cylinder 27 being limited at, its upper end by a flap-type floor 6 equipped with adjustable flap members 6a. The uppermost element of the container 101 is constituted by the charging and distributor cylinder 28K.

The prepared refuse-sludge mixture is delivered by means of a suitable automatically operated conveyor e.g. chain conveyor 1 through the agency of a hydraulically actuated charging sluice 2 through the container inlet opening 104 into the charging- and distributor compartment or cylinder 28K. The container inlet opening 104 may be adjusted in height by an expansible bellows 105 by springs and hydraulic drive means 106 such that changes in height are compensated by temperature fluctuations. By means of a distributor plough 7, driven by a hydrostatic drive 4, the infed material is introduced through the individually adjustable flaps 6a of the flap-type floor 6 uniformly into the charging cylinder 27. The fill height is monitored by means of a level control mechanism 22 which is operatively coupled with the charging sluice 2 and the distributor plough 7. At the central axis of the reactor or equipment there is disposed the rotatable aeration tube or pipe 28 which is subdivided into three separate air impinged zones, generally indicated by 28a, 28b and 28c respectively. One or a number of rows of air discharge nozzles 14 are mounted at this rotatable air infeed tube 28. The rotational speed of the aeration tube 28 can be infinitely controlled by a suitable hydrostatic drive 5 from 0 to 60 rpm. for instance.

There is a separate infeed of air to the individual zones and air is introduced through the air infeed lines or tubes 13, 131, 132, via a kingpin 3. Prior to the introduction or blowing-in of the infed air, the latter is prepared in a conventional air conditioning installation, schematically represented at 107, so as to possess the proper humidity and temperature for the decomposition process. The pressure required for blowing-in such air can be obtained from a compressor or blower 108. The outgoing or effluent air is sucked-off in zones through grates 9 via a respective suction blower. All six grates of a zone are connected with one another by an annular conduit 12. Owing to the described and selected arrangement, the individual elements can be easily coupled with a separate suction blower. The very slight velocity of the material can result in the formation of bridges and therefore interrupt the continuous throughput. In order to prevent the formation of these material bridges, the grates 9 can be moved by hydraulic cylinders 11. This movement is carried out such that the decomposition process which takes place at the material is not disturbed, but the movement is still sufficient to insure a uniform throughput movement of the material.

Now by means of the hydraulic drives 11 it is possible to independently control, for each individual grate 9, the movement of such grates 9 with regard to their stroke velocity, frequency and stroke. The control mechanism for the hydraulic equipment has not been particularly illustrated in the drawings since various types of controls can be designed which are suitable for the purpose of controlling the operation of the inventive equipment and the control function will be described to the extent necessary so that those skilled in the art will have a full appreciation of the inventive concepts involved. The movement of the grates 9 can be maintained within limits so that the material will practically not be disturbed for the transformation or conversion process and there is insured a uniform material throughput.

The individual grates 9 together with the heat-insulated outer or suction boxes 29 and the hydraulic drives or cylinders 11 form a structural unit 8 which can be readily exchanged and the units are identical for each zone. Material which is sucked-in through the grates 9 falls into the associated suction box 29 onto the floor thereof and can be easily periodically removed by openings closed by removable covers 30. The temperature over the entire cross-section of the aeration zones 26a, 26b and 26c and for each such zone is individually registered by means of hydraulically forwardly movable and retractable control probes or needles 21 driven by the schematically shown hydraulic drive 21a.

The above-described equipment, which can also be referred to as a zone reactor, has been developed for the undisturbed bacteriological decomposition of prepared refuse-sludge mixtures into earth. It possesses the shape of a closed container. The appropriately prepared refuse-sludge mixture is automatically delivered by means of the chain conveyor to the zone reactor. By means of the flap-type floor or bottom 6 with the individually adjustable flaps 6a and the distributor ploughs 7 the infed material is uniformly introduced into the reactor throughout its entire cross-section. By means of the material level control 22 the infeed of material is monitored. The aeration and deaeration of the undisturbed material takes place in the three zones 26a, 26b and 26c which have been subdivided for aeration purposes in the manner described above. The air is drawn from the rotating central infeed pipe or tube 28 transversely to the grates 9. The air which has been maintained at a desired temperature and a desired moisture content is blown into the central tube 28 in three independent zones 28a, 28b and 28c at a controlled pressure and is sucked through the grates g by any suitable suction blower means. Owing to the selected arrangement of the air infeed nine different variations of aeration can be selected; for instance, all of the zones can be uniformly aerated and deaerated; only the central zone is aerated and deaerated; air is blown into the lowermost zone and withdrawn at the uppermost zone, and so forth. The following measurement parameters are available for control purposes: (a) $CO_2$-content of the withdrawn air at the individual zones; (b) temperature of the individual cross-sectional points of the individual zones; (c) air infeed resistance of the individual zones; (d) the moisture content of the outgoing or effluent air from the individual zones. Such measurement data can be measured by the following units:

a. a respective auxiliary blower for each zone constantly withdraws the outgoing air through a $CO_2$-measuring device and at the same time the temperature and moisture content of the outgoing air are measured.

b. the temperature of the material is fixedly maintained for each zone individually throughout the entire cross-section by means of the temperature probes 21.

c. a pressure measuring device measures the resistance of the infed air to the individual zones.

These measurement values or data are collected at a control unit and evaluated for the purpose of controlling aeration and deaeration.

This control encompasses then the following elements:

a. the infed air and outgoing air in the momentarily required variations;

b. the rotational speed of the central tube 28;

c. moisture content of the infed air;

d. temperature of the infed air;

e. movement of the air withdrawal grates 9; and f. discharge.

Owing to the described arrangement and control of the transverse aeration the aeration of the material is automatically insured at each point of the material column. Owing to the controlled infeed of the influent air or oxygen, it is possible to admix therewith an additive gas, oxygen for instance.

The continuous undisturbed material throughput is insured, on the one hand, by rotation of the central tube 28 and, on the other hand, by pump movement of the withdrawal grates 9.

The throughput times amount to between 4 and 7 days. The final product is absolutely faultless physiologically and bacteriologically. A subsequent pasteurization is not required since the material is maintained for at least two hours in the reactor at a temperature of 75°–85° C.

While there is shown and described present preferred embodiments of the invention, it is to be distinctly understood that the invention is not limited thereto but may be otherwise variously embodied and practiced within the scope of the following claims.

Accordingly, what is claimed is:

1. An apparatus for the continuous conversion of prepared refuse-sewage sludge mixtures by biolĭgical decomposition, into earth substances, comprising, in combination, a substantially vertical container closed at all sides; means at the top of said container for automatically infeeding the material destined to be converted; means at the bottom of said container for automatically removing the material upon completion of the decomposition process; gas infeed means for an oxygen-containing gas required for the conversion process, said gas infeed means comprising a central tube extending along the central axis of said container and provided with gas discharge openings spaced therealong to discharge transversely of said container toward the sides thereof, and arranged in vertically spaced groups each extending vertically of, and vertically defining, a respective individual aeration zone within said container; said tube being mounted for rotation about its axis; and means for drawing off said oxygen-containing gas, said drawing off means comprising suction boxes arranged in spaced relation along the circumference and at the outside of said container in vertically spaced groups at different respective levels, with each group of suction boxes being aligned, transversely of said container, with a respective group of gas discharge openings to further define the associated individual aeration zone; each suction box communicating with the interior of said container through a respective opening, in the container wall, covered by a respective grate.

2. The apparatus as defined in claim 1, further including hydraulic drive means for moving said grates, independently of one another, in a substantially horizontal direction.

3. The apparatus as defined in claim 1, wherein said suction boxes are provided with removable cover means, said cover means covering an opening for removing the material accumulated within said suction boxes.

4. The apparatus as defined in claim 1, further including temperature probes for measuring the temperature of the material, said temperature probes being arranged at different heights and being movable in a direction transverse to the central axis of said container.

5. The apparatus as defined in claim 1, further including a charging and distributor cylinder at the top of said container, having a slat-type floor covering the entire cross-section of said container; said floor being composed of individually adjustable flaps; charging sluice means operable to introduce the mixture to be treated into said charging and distributor cylinder; and a revolving distributor plow arranged within said charging and distributor cylinder and adapted to uniformly distribute the mixture to be treated, introduced through said charging sluice means, over the entire cross-section of said container and to move the material through openings defined by said individually adjustable flaps.

6. The apparatus as defined in claim 1, including infeed lines for the oxygen-containing gas arranged within said central tube, the discharge openings of said infeed lines terminating at different levels corresponding to the respective levels of said suction boxes.

7. The apparatus as defined in claim 6, further including conditioning means for conditioning the gas introduced in said infeed lines with regard to temperature and humidity.

* * * * *